United States Patent
Madden

(10) Patent No.: US 10,062,069 B1
(45) Date of Patent: Aug. 28, 2018

(54) SYSTEMS AND METHODS REGARDING POINT-OF-RECOGNITION OPTIMIZATION OF ONSITE USER PURCHASES AT A PHYSICAL LOCATION

(71) Applicant: The Bartley J. Madden Foundation, Naples, FL (US)

(72) Inventor: Bartley J. Madden, Naples, FL (US)

(73) Assignee: The Bartley J. Madden Foundation, Naples, FL (US)

( * ) Notice: Subject to any disclaimer, the term of this patent is extended or adjusted under 35 U.S.C. 154(b) by 0 days.

(21) Appl. No.: 15/953,187

(22) Filed: Apr. 13, 2018

Related U.S. Application Data

(63) Continuation-in-part of application No. 15/637,675, filed on Jun. 29, 2017, now Pat. No. 9,978,086.

(51) Int. Cl.
*G06Q 30/00* (2012.01)
*G06Q 20/20* (2012.01)
*G06Q 30/02* (2012.01)

(52) U.S. Cl.
CPC ......... *G06Q 20/208* (2013.01); *G06Q 20/202* (2013.01); *G06Q 30/0238* (2013.01); *G06Q 30/0267* (2013.01); *G06Q 30/0268* (2013.01)

(58) Field of Classification Search
CPC .. G06Q 20/10; G06Q 20/204; G06Q 30/0623; G06Q 30/0629; G06Q 30/0631; G06Q 30/0635; G06Q 30/02; G06Q 10/08; G06Q 10/08345; G06Q 20/201
USPC ......... 705/17, 21, 26.41, 26.5, 26.61, 26.62, 705/26.63, 26.64, 26.7, 26.9, 27.1, 27.2, 705/26.82; 235/375, 376, 378
See application file for complete search history.

(56) References Cited

U.S. PATENT DOCUMENTS

| | | | |
|---|---|---|---|
| 7,509,262 B2 * | 3/2009 | Hamzy | G06Q 10/08 705/26.7 |
| 7,740,172 B1 * | 6/2010 | Hubert | G06Q 30/02 235/383 |
| 7,949,572 B2 * | 5/2011 | Perrochon | G06Q 30/0603 705/26.41 |
| 7,979,340 B2 * | 7/2011 | MacDonald Korth | G06Q 10/06 705/26.5 |
| 8,688,517 B2 * | 4/2014 | Lutnick | G06Q 30/02 705/14.1 |

(Continued)

*Primary Examiner* — Andrew Joseph Rudy
(74) *Attorney, Agent, or Firm* — Marshall, Gerstein & Borun LLP; Randall G. Rueth

(57) ABSTRACT

Systems and methods are described for a point-of-recognition optimizer system configured to optimize onsite user purchases at a physical location. In various aspects, a purchasable-unit identifier (ID) may be received via a computer transmission, where the purchasable-unit ID, as identified by an optimizer device, is associated with a recognized purchasable-unit located onsite with the optimizer device. Based on the purchasable-unit ID, a plurality of competing purchasable-units may be identified, which may be either onsite or offsite purchasable-units. An offer is transmitted via a second computer transmission for an offered purchasable-unit to the optimizer device where the offer originates from an outbidding purchasable-unit distributor, and where the outbidding purchasable-unit distributor outbid other competing purchasable-unit distributors, each distributor corresponding to the plurality of competing purchasable-units, for an opportunity for the optimizer device to receive the offer.

10 Claims, 5 Drawing Sheets

(56) References Cited

U.S. PATENT DOCUMENTS

| | | | | |
|---|---|---|---|---|
| 9,082,149 B2* | 7/2015 | Argue | ................ | G06Q 30/0601 |
| 9,262,771 B1* | 2/2016 | Patel | ................... | G06Q 20/325 |
| 9,479,328 B1* | 10/2016 | Wilburn | ................ | H04L 9/0822 |
| 9,483,789 B1* | 11/2016 | Hanlon | .............. | G06Q 30/0631 |
| 9,524,507 B2* | 12/2016 | Zamer | ................ | G06Q 30/0206 |
| 9,619,832 B2* | 4/2017 | Kreiner | .................. | G06Q 30/06 |
| 9,836,727 B1* | 12/2017 | Brennan | ............. | G06Q 20/108 |
| 9,836,728 B1* | 12/2017 | Brennan | ............. | G06Q 20/108 |
| 9,875,497 B1* | 1/2018 | Kotas | ................ | G06Q 30/0625 |
| 9,881,261 B2* | 1/2018 | Subbaraj | ................ | G06Q 10/02 |
| 9,916,010 B2* | 3/2018 | Harris | .................... | G06F 3/017 |

* cited by examiner

SYSTEMS AND METHODS REGARDING POINT-OF-RECOGNITION OPTIMIZATION OF ONSITE USER PURCHASES AT A PHYSICAL LOCATION

FIELD OF THE DISCLOSURE

The present disclosure generally relates to point-of-recognition optimizer systems and methods, and, more particularly, to point-of-recognition optimizer systems and methods for optimizing onsite user purchases at physical locations.

BACKGROUND

Firms or entities that own or operate physical stores, which allow for onsite consumer shopping, such as Wal-Mart, have encountered significant competition from online, virtual stores such as Amazon. Physical store owners or operators have responded to the threat of virtual stores with their own versions of online, virtual store websites. However, such direct competition has so far achieved a limited amount of success relative to popular online stores such as Amazon.

New competition from virtual stores has not only impacted the market share and sales of physical store owners or operators, but has also disrupted advertising firms that deliver advertisements to consumers via print, electronic, or other media outlets. In addition, conventional advertising firms do not have direct access to consumer data that can be used to indicate specific consumers' needs and preferences and that would otherwise allow the advertising firms to better target the needs and preferences of the specific consumers.

In addition, today's physical stores rely on time-intensive manual checkout procedures that require store clerks to individually handle products, which can include identifying a product's Universal Product Code (UPC) barcode, scanning that UPC into a traditional point-of-sale system, and otherwise finalizing a purchase transaction for the consumer. While new technologies exist that can eliminate the need for a UPC scanner, such newer technologies still require manual checkout that rely on time-consuming store clerks and checkout lines that can detract from the overall onsite consumer shopping experience.

SUMMARY

In order to overcome the aforementioned issues, embodiments for point-of-recognition optimizer systems and methods are described herein for optimizing onsite user purchases at physical locations. Firms or entities that own or operate physical stores can use the point-of-recognition optimizer systems and methods to improve consumer in-store shopping experiences and, therefore, better compete against online, virtual stores like Amazon. The point-of-recognition optimizer systems and methods also provide the opportunity for the firms or entities to compete for advertising revenue against data-intensive firms such as Google and Facebook. As described herein, the point-of-recognition optimizer systems and methods allow for physical stores to optimize consumer purchases, checkout, and the collection and use of user-centric information.

In various embodiments, a point-of-recognition optimizer system can include one or more processors and one or more computer memories, where the system can be configured to receive, via a first computer transmission, a purchasable-unit identifier (ID) associated with a purchasable-unit. A purchasable-unit, may be, for example, a unit of a retail product located onsite at a physical store, where the purchasable-unit ID may uniquely identify the unit and/or retail product. In some embodiments, the purchasable-unit may have a plurality of surfaces and the purchasable-unit ID may be identifiable to the optimizer device on each of the plurality surfaces as described herein.

In some embodiments, the purchasable-unit may be a product manufactured and/or distributed by a particular manufacturer to the physical store and made available to consumers onsite. In other embodiments, the purchasable-unit may be a product distributed on behalf of a manufacturer by a product wholesaler to the physical store, and, therefore available to consumers onsite.

In various embodiments, a purchasable-unit and its related purchasable-unit ID may be identified or recognized by an optimizer device associated with a consumer or user. For example, the recognized purchasable-unit can be located onsite with the optimizer device, so that a consumer or user can use the optimizer device to identify the recognized purchasable-unit and its related purchasable-unit ID. The optimizer device can include one or more processors for executing the systems and methods disclosed herein. For example, some embodiments the optimizer device may be a mobile phone or other portable electronic device, such as a tablet, of the user. In other embodiments, the optimizer device may include two separate devices including a hand-held product identifier device for identifying purchasable units and a display screen device for displaying offers as further described herein.

In some embodiments, the purchasable-unit ID may be used to determine a plurality of competing purchasable-units. For example, the plurality of competing purchasable-units can include the recognized purchasable-unit identified by the optimizer device and one or more additional purchasable-units offered by competing manufacturers, wholesalers, or other distributors.

In various embodiments, the point-of-recognition optimizer system can transmit, via a second computer transmission, an offer for an offered purchasable-unit to the optimizer device, where the user can view the offer on the optimizer device. The offer may originate from a particular purchasable-unit distributor, such as a manufacturer or wholesaler of the purchasable-unit.

In certain embodiments, the particular distributor that sent the offer may have outbid other distributors who competed for the opportunity for the optimizer device, and therefore the user, to receive the offer. For example, the outbidding purchasable-unit distributor may have been chosen from a plurality of competing purchasable-unit distributors, where each of the plurality of competing purchasable-unit distributors, including the outbidding purchasable-unit distributor, may correspond to a respective plurality of competing purchasable-units. The plurality of competing purchasable-units may include the recognized purchasable-unit, the offered purchasable unit, and any remaining purchase-units have similar or competing features. For example, in one embodiment, the plurality of competing purchasable-units can include a same type of purchasable-unit, where the purchasable-units are commodities or near-commodities to one another. In other embodiment, for example, the plurality of competing purchasable-units can include two or more purchasable-units of different types, where the products are not commodities, but instead offer competing features or that can be used in a manner such that a consumer could choose one product over the other.

In various embodiments, each of the competing purchasable-unit distributions, which includes the outbidding purchasable-unit distributor, can access a user-centric information profile in order to generate competing bids. As described herein, the user-centric information profile may include details about the user's past purchase history or other personal information to allow the distributors to generate informed and data-driven offers or advertisements targeted to the user. The outbidding purchasable-unit distributor is the distributor that wins the bidding process and therefore is able to generate the offer received by the optimizer device, and, therefore the user.

For example, in one embodiment, the outbidding purchase-unit distributor may be the distributor that agrees to pay a highest distributor fee, with respect to each of the other distributors, to the owner or operator of the store for the opportunity of the user's optimizer device to receive the offer as described herein.

In other embodiments, the outbidding purchase-unit distributor may also be the distributor that submits or bids a best value to the user or consumer, such that the offer includes an offer value that is most favorable to the consumer. In such embodiments, the offer value may be based on the user's user-centric information.

In some embodiments, the optimizer device may be operable to receive the user's information in order to generate or update the user's user-center information profile. For example, the optimizer device may include a display unit and an input unit. The display unit, such as a display screen of a mobile device, may be operable to display the offer and the user-centric information to the user. The input unit, such as a keyboard or keypad of a mobile device, may be operable to receive user-centric information for generating or further updating the user-centric information profile. The input unit may also be operable to receive login information for activating the optimizer device in order to protect the user's user-centric information or preclude other, non-authorized, users from making purchases on the user's behalf.

In other embodiments, the optimizer device may include an optical unit, such as a camera, sensor, or scanning device, that the user can use to take digital images or source other such optical information from documents including, for example, the user's automobile registrations, tax bills, utility bills, real estate records, or other such records, and use that optical information to generate or update the user-centric information profile. For example, the user may take a picture of his or her automobile registrations, utility bills, etc., where such information may be uploaded to the point-of-recognition optimizer system and used to generate or update the user-centric information profile.

In various embodiments, the plurality of competing purchasable-unit distributors can include one or more product manufacturers and one or more product wholesalers who distributed the corresponding competing purchasable-units to a physical store for onsite identification and selection by consumers.

In some embodiments, the offered purchasable-unit may be the same as the recognized purchasable-unit. For example, in such embodiments, the offer may originate from the distributor of the recognized purchasable-unit, where the distributor of the recognized purchasable-unit outbid all other distributors for the opportunity of the optimizer device to receive the offer.

In other embodiments, the offered purchasable-unit is different from the recognized purchasable-unit. For example, in such embodiments, the offer may originate from a new distributor, different from the distributor of the recognized purchasable-unit, where the new distributor outbid all other distributors, including the distributor of the recognized purchasable-unit, for the opportunity of the optimizer device to receive the offer.

In various embodiments, the optimizer device may facilitate a user purchase. For example, in some embodiments the optimizer device may be configured to detect that a chosen purchasable-unit has been associated with the user. The chosen purchasable-unit can be a purchasable-unit that the user choses to purchase, which can be any of the recognized purchasable-unit, the offered purchasable-unit, or any of the other plurality of competing purchasable-units onsite at the physical location. In any event, the chosen purchasable unit can be identified with a chosen purchasable-unit identifier (ID) that uniquely identifies the chosen purchasable-unit identifier (ID).

In some embodiments, the chosen purchasable-unit may be detected with one or more sensors associated with a user container when the user places the chosen purchasable-unit in the user container. In some embodiments, the user container can be, for example, a shopping cart, shopping basket, or other designated location or container at the physical location that the user places the chosen purchasable-unit.

In several embodiments, the optimizer device can initiate a purchase request, based on the chosen purchasable-unit identifier (ID), to purchase the chosen purchasable-unit when the user is within a proximity to an exit of the physical location.

Based on the purchase request, in several embodiments, the optimizer device can cause an update to a user-centric information profile associated with the user.

In some embodiments, the optimizer device may be further configured to determine that an interference threshold value has been passed regarding the user's interaction with the user container, and generate, based on the interference threshold value, an alert, the alert indicating to onsite personnel to assist the user.

In still further embodiments, the offered purchasable-unit may not be available onsite at the physical location. In such embodiments, the user may purchase the offered purchasable-unit, via the optimizer device, for delivery of the offered purchasable-unit to an address specified by the user.

Accordingly, the benefits of the point-of-recognition optimizer systems and methods are designed to incentivize both the consumer and the firm or entity that owns or operate the physical, onsite store or location, to enhance the consumer onsite shopping experience, and, therefore promote onsite, physical store sales. For example, consumers can benefit from competition-induced lower prices encouraged by the distributors competing against one another to provide consumers with various offers that can include discounts, advertisements for new or different products, or other such incentive-based offers. For example, as described herein, the point-of-recognition optimizer systems and methods allow for distributors to access a user's user-centric information profile to analyze information about the consumer and bid on the opportunity to transmit offers, which can include advertisements and coupons, at the exact time when consumers are about to make a purchase decision.

Moreover, the point-of-recognition optimizer system and methods motivates consumers to participate in onsite, physical store sales, because when consumers provide verifiable consumer information (e.g., tax bills, auto insurance cards showing make, model, and year of owned automobiles, etc.), consumers can receive targeted, relative, and potentially more valuable offers from the competing purchasable-unit distributors. In addition, the competing purchasable-unit distributors can reliably verify each consumer's purchasing power based on the consumer's user-centric information profile.

In addition, the firm or entity that owns or operates a store may also benefit from the increased consumer traffic, and potential revenue, that arises from consumer motivation for receiving the competing offers from multiple competing purchasable-unit distributors as described herein. Moreover, from the point of view of the firm or entity, the point-of-recognition optimizer systems and methods can be far less capital intensive, and can scale in proportion to consumer use, when compared with other competing point-of-sale systems or checkout procedures that can require additional checkout lanes, etc. This is especially true when compared with point-of-recognition optimizer embodiments where consumers bring and use their own optimizer devices, such as their mobile phones, as described herein. Accordingly, by using the point-of-recognition optimizer systems and methods, consumers can avoid the conventional time-consuming checkout process while onsite, physical store productivity significantly improves.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Figure 1:
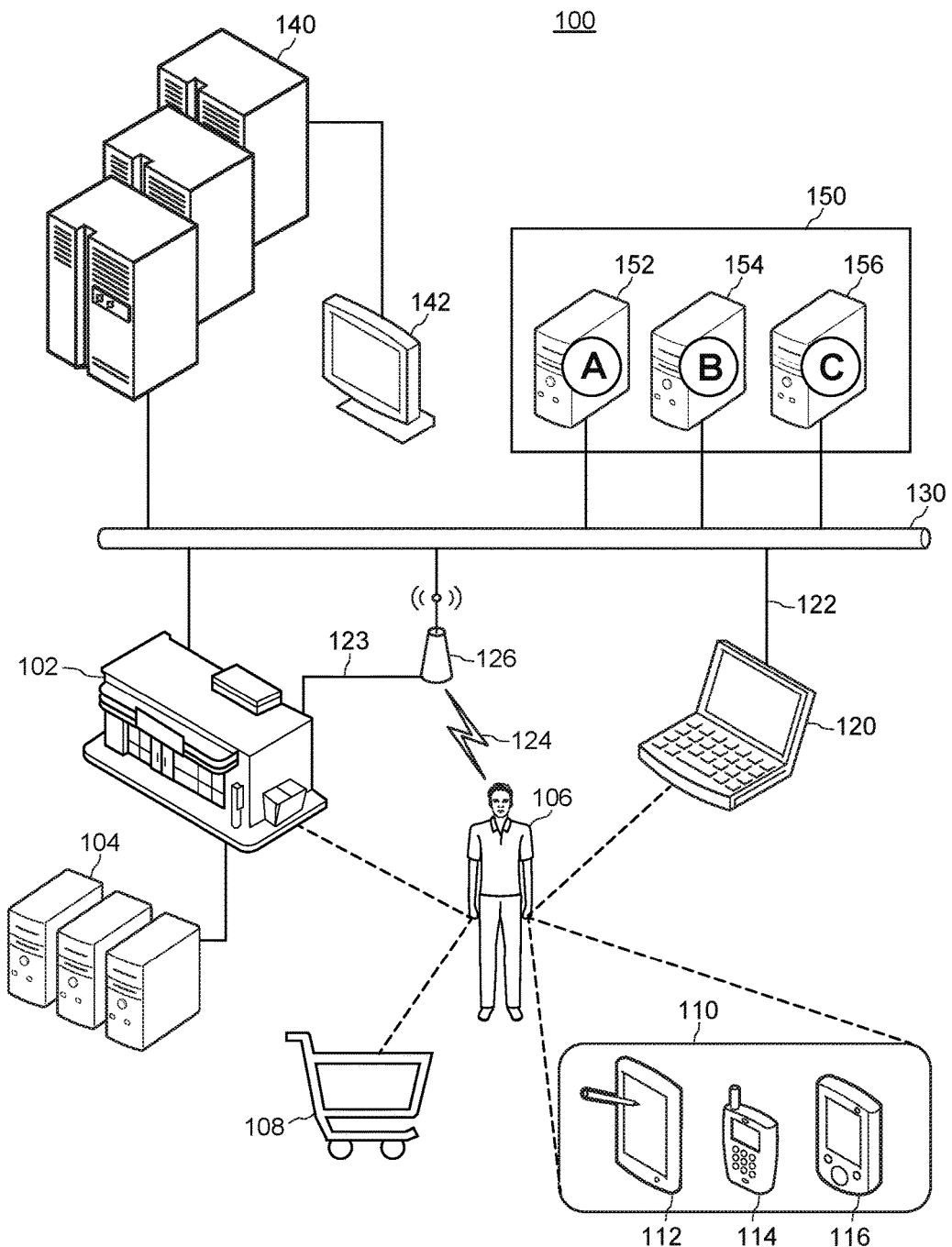
FIG. 1 illustrates an exemplary computer network in accordance with various embodiments of the point-of-recognition optimizer systems and methods described herein.

FIG. 1 illustrates an exemplary computer network 100 in accordance with various embodiments of the point-of-recognition optimizer systems and methods described herein. The computer network 100 includes one or more local point-of-recognition optimizer servers 104. The local point-of-recognition optimizer servers 104 may include one or more processors configured to optimize onsite user purchases at a physical location as described herein. The local point-of-recognition optimizer servers 104 may implement any number of web-based platforms such as Microsoft ASP.NET, Java Server Pages (JSP), Ruby on Rails, or other such web-based platforms in order to receive and respond to computer transmissions as described herein. The local point-of-recognition optimizer servers 104 may further include one or more computer memories for storing information, such as user-center information profiles and other user information as described herein. The local point-of-recognition optimizer servers 104 may also implement one or more database platforms for storing and organizing the user-center information profiles and other user information, which may include, for example, Oracle Database, IBM DB2, MySQL, MongoDB, or other such database platforms.

The local point-of-recognition optimizer servers 104 may be located onsite at a physical location, such as store 102. Store 102 may be a physical retail location offering purchasable-units to consumers, such as user 106, as described herein. For example, store 102 may be an electronic retail store that sells numerous competing retail electronic products. In other examples, store 102 may be a general retail store that sells a variety of different types or kinds of purchasable-unit products. In still further embodiments, store 102 may be a membership-based store that sells wholesale products direct to consumers.

In some embodiments, the point-of-recognition optimizer system may operate remotely. For example, as shown in FIG. 1, remote point-of-recognition optimizer servers 140, which are similar to local point-of-recognition optimizer servers 104, communicate with store 102 remotely through a network 130. Network 130 allows computer transmissions to be received and transmitted to and from the remote point-of-recognition optimizer servers 140. In some embodiments, network 130 may be a private network that connects store 102, and its local point-of-recognition servers 104, to the remote point-of-recognition optimizer servers 140. In other embodiments, network 130 may be a public network, such as the Internet, where store 102, and its local point-of-recognition servers 104, and remote point-of-recognition optimizer servers 140 communicate over conventional Internet protocols and standards, for example, including the Hyper Text Transfer Protocol (HTTP), Transfer Control Protocol (TCP), and the Internet Protocol (IP). The remote point-of-recognition optimizer servers 140 may be similarly configured to the local point-of-recognition optimizer servers 104 such that the remote point-of-recognition optimizer servers 140 also include one or more processors configured to optimize onsite user purchases at a physical location as described herein. Similarly, the remote point-of-recognition optimizer servers 140 may also include one or more memories for storing information, such as user-center information profiles and other user information as described herein. The remote point-of-recognition optimizer servers 140 may also implement one or more web-based platforms and/or database platforms as described for the local point-of-recognition optimizer servers 104. The remote point-of-recognition optimizer servers 140 may also include a local terminal 142, where an operator of the remote point-of-recognition optimizer servers 140 may view, update, or modify information, such as user information or user-centric information profiles as described herein. Local terminal 142 may also be used to manage and maintain the point-of-recognition optimizer system, including diagnose or maintain any of the remote point-of-recognition optimizer servers 140 or the local point-of-recognition optimizer servers 104, where the local point-of-recognition optimizer servers 104 are accessed via network 130.

In some embodiments, the point-of-recognition optimizer systems and methods may be implemented only on local point-of-recognition optimizer servers 104. In other embodiments, the point-of-recognition optimizer systems and methods may be implemented only on the remote point-of-recognition optimizer servers 140. In still further embodiments the point-of-recognition optimizer systems and methods are implemented via a hybrid approach where both the local point-of-recognition optimizer servers 104 and the remote point-of-recognition optimizer servers 140 implement the point-of-recognition optimizer systems and methods. For example, in one hybrid embodiment, the local point-of-recognition optimizer servers 104 may implement the functionality regarding receiving a purchasable-unit identifier (ID) associated with a recognized purchasable-unit identified by an optimizer device, determining a plurality of competing purchasable-units based on the purchasable-unit ID, and transmitting an offer for an offered purchasable-unit to the optimizer device, where the remote point-of-recognition optimizer servers 140 may implement the functionality of receiving a purchase request and updating a user-centric information profile associated with the user based on the purchase request. As contemplated herein, various other hybrid embodiments may also be implemented, where at least a portion of the optimizer functionality is implemented via the local point-of-recognition optimizer servers 104 and the remaining or other portions are implemented via the remote point-of-recognition optimizer servers 140.

User 106 may be a consumer onsite at store 102. User 106 may interact with the point-of-recognition optimizer systems, such as provided by any of the local point-of-recognition optimizer servers 104 or the remote point-of-recognition optimizer servers 140, via an optimizer device 110. Optimizer device 110 may be a portable electronic device that may include one or more processors, one or more computer memories, a display unit (e.g., a display screen) for displaying information to user 106, and an input unit (e.g., a keyboard) for receiving information from user 106. For example, the optimizer device 110 may be any of a tablet device 112, mobile phone 114, or other such portable electronic device 116.

In one embodiment, the optimizer device 110 may be provided by the owner or operator of store 102 to user 106 when user 106 enters store 102. For example, user 106 may receive the optimizer device from store personnel (or from a designated pickup location) of store 102 when user 106 enters the store, where the user 106 may return the optimizer device 110 to the store personnel (or designed pickup location) when user 106 exits the store. The optimizer device 110 may be configured to interact with any of the local point-of-recognition optimizer servers 104 or the remote point-of-recognition optimizer servers 140 to optimize onsite user purchases at store 102 as described herein.

In another embodiment, user 106 may own or otherwise control the optimizer device 110 outside of store 102. For example, the optimizer device 110 may be the user 106's own mobile phone, such as mobile phone 114. In such embodiments, user 106 can download an optimizer mobile application (e.g., an "Optimizer App") onto mobile phone 114 in order to allow mobile phone 114 to communicate with any of the local point-of-recognition optimizer servers 104 or the remote point-of-recognition optimizer servers 140. The Optimizer App may be implemented via a mobile application platform including, for example, Apple iOS, Google Android, or any other such mobile application platform, to optimize onsite user purchases at store 102 as described herein.

The optimizer device 110 may also include a transceiver for transmitting and receiving computer transmissions to and from network 130 and, therefore, through network 130 to any of the local point-of-recognition optimizer servers 104 or the remote point-of-recognition optimizer servers 140. As illustrated by FIG. 1, network 130 may include a wireless transceiver 126 for facilitating transmissions 124 to and from user 106's optimizer device 110. In some embodiments, the transceiver 126 may also be located onsite at store 102 and may receive and transmit transmissions 124 through a private store network 123. In one embodiment, transceiver 126 may be a WiFi access point implementing, for example, the IEEE 802.11 standard for electronic wireless network access, where wireless transmissions 124 are received and transmitted to and from transceiver 126 and routed through private store network 123 for interaction with the point-of-recognition optimizer system, which can include interaction with any of the local point-of-recognition optimizer servers 104 or the remote point-of-recognition optimizer servers 140. In present embodiment, the transceiver 126 may be located onsite at store 102 such that when user 106 enters store 102, the point-of-recognition optimizer system can begin to interact with the user 106's optimizer device 110 through private store network 123 and transceiver 126, for example, by requesting login information from the user 106 in order to activate the optimizer device 110 with the point-of-recognition optimizer system.

In another embodiment, the transceiver 126 may be a cellular network tower, base station, or other mobile phone base station that can send and receive transmissions 124 to and from optimizer device 110. The transmissions 124 may be based on any of a number of mobile communication standards including GSM, EDGE, UMTS/UTRA, 3GPP, LTE, CDMA, UMB, or other such mobile phone standards. The transmissions 124 may be sent to and from the optimizer device 110 via a mobile base station transceiver 126, where the transmissions may be routed through network 130 to any of the local point-of-recognition optimizer servers 104 or the remote point-of-recognition optimizer servers 140. In the present embodiment, the optimizer device 110 may include a global positing satellite (GPS) unit, such as a GPS microchip within the optimizer device 110, which may be used to determine the position of user 106. For example, the GPS unit can detect when user 106 enters store 102, so that the point-of-recognition optimizer system can begin to interact with the user 106's optimizer device 110, for example, by requesting login information from the user 106 in order to active the optimizer device 110 with the point-of-recognition optimizer system.

User 106 may also interact with a user container 108, which, in some embodiments, can be an optimizer shopping cart or shopping basket as described herein. The user container 108 may include one or more sensors, such as infrared (IR) sensors, motion detection sensors, image detection sensors, weight detection sensors, accelerometers, gyro sensors, or other such sensors, for detecting when a user places or removes a purchasable-unit in or from the user container. In some embodiments, the user container 108 may be located onsite at store 102 and may be provided by the store 102 owner or operator user 106 when user 106 enters store 102. In some embodiments, the user container 108 may also include a transceiver for sending wireless transmissions, such as Bluetooth standard wireless transmissions, to and from the optimizer device 110. In other embodiments, the user container 108 may include a wired interface, such as a universal serial bus (USB), to provide a wired connection (not shown) for connecting the user container 108 to the optimizer device 110 to facilitate optimizing onsite user purchases at a physical location as described herein.

In various embodiments, user 106 may provide user information to the store 102 owner or operator. For example, in one embodiment user 106 may enter user information via optimizer device 110 for upload to any of the local point-of-recognition optimizer servers 104 or the remote point-of-recognition optimizer servers 140. The user information may include information about the user, for example, the user's name, home address, email address, credit score, net worth, or other such information. The user information may also include document based information, including information from the user 106's tax bills, real estate records, utility bills, automobile records, insurance cards, vehicle registrations, and the like. In some embodiments the information may be entered via the optimizer device 110, such as via the user inputting the information via a keyboard of the optimizer device 110.

In other embodiments, the user information may be entered via an optical unit, such as camera or image sensor associated with the optimizer device, where the user 106 takes a picture or otherwise scans the document such that the user information is sourced and captured directly from the document. For example, the optical sourced user-centric information may include information from document(s) such as real estate tax bills, car insurance documents, and the like. This visual process may verify the validity of the data inputted, where a copy of the document, together with its information, may be stored within the computer memory of the local point-of-recognition optimizer servers 104 or the remote point-of-recognition optimizer servers 140, and can be used for authentication and/or validity purposes. For example, authentication and/or validity can include comparing the optical sourced user-centric information/document to trusted user information, such as user credit card information or equivalent information, such that the user-centric information is verified against trusted information of the user. Optical sourcing can include the use of object character recognition (OCR), where the characters and text of the document are identified from the optical source and used to digitally create an electronic version of the information for upload to and storage with any of the local point-of-recognition optimizer servers 104 or the remote point-of-recognition optimizer servers 140. Thus, for example, a display screen of the optimizer device 110 may display a user-centric information profile as described herein and may be used to input personal data such as real estate tax bills, car insurance documents, and the like. The optical recognition capability of the optimizer device 110 may capture the consumer's name and address and may cross-check with consumer's credit card or equivalent data. In this manner, such user-centric information/personal data is verified.

In still further embodiments, user 106 may input the information via another device, such as user laptop 120. In such embodiments, the user may enter or upload information or documents to any of local point-of-recognition optimizer servers 104 or remote point-of-recognition optimizer servers 140 from user laptop 120 via network 130. The user laptop 120 may be connected to network 130, and, therefore local point-of-recognition optimizer servers 104 and remote point-of-recognition optimizer servers 140, via connection 122, which can be, for example an Internet connection.

As described herein, the user information may be used to generate or update a user-centric information profile. The user information and a user-centric information profile may be stored on and accessed from the computer memory and/or databases of local point-of-recognition optimizer servers 104 or remote point-of-recognition optimizer servers 140. The user-centric information profile may contain all of the data and information uploaded by user 106. The user-centric information profile may contain a user identifier (ID) that uniquely identifies user 106 in the point-of-recognition optimizer system. The user-centric information profile may also contain a user score or ranking, which ranks the user 106 as compared with other users of the system. The user score can be based on all or a portion of the information provided by the user. In one embodiment, for example, the user score could indicate the user 106's purchasing power, such as the consumer's ability to purchase products or purchasable units, other such purchasing related metrics. In some embodiments, the user score may be similar to the user's credit score, such as a credit score conventionally provided by Equifax, Experian, or Transunion.

In various embodiments described herein, one or more competing purchasable-unit distributors A-C 150 may access the user information or the user-centric information profile of user 106 over network 130. The competing purchasable-unit distributors A-C 150 may be competing manufactures or wholesale distributors that provide purchasable-unit products to store 102 and/or its customers. The competing purchasable-unit distributors A-C 150 may be associated with respective servers, including each of competing purchasable-unit distributor server A 152, competing purchasable-unit distributor server B 154, and competing purchasable-unit distributor server C 156. As illustrated in the embodiment of FIG. 1, the competing purchasable-unit distributor servers A-C(152-156) are each connected to network 130 and may receive and transmit computer transmissions via network 130 to any of the local point-of-recognition optimizer servers 104, the remote point-of-recognition optimizer servers 140, the user 106 optimizer device 110, or the user laptop 120.

Each of the competing purchasable-unit distributor servers A-C(152-156) may include one or more processors and computer memories and may implement one or more web-based platforms such as Microsoft ASP.NET, Java Server Pages (JSP), Ruby on Rails, or other such web-based platforms in order to receive and respond to computer transmissions via network 130 as described herein.

In some embodiments, user 106 may use the optimizer device 110 to identify and recognize a purchasable-unit and its related purchasable-unit ID. The point-of-recognition optimizer servers 104 or 140 may then determine a plurality of competing purchase-units based on the recognized purchasable unit's purchasable-unit ID, where each of the competing purchase-units correspond to purchasable-units manufactured by, distributed by, or otherwise provided by each competing purchasable-unit distributors A-C 150.

Each the competing purchasable-unit distributor servers A-C(152-156) may then each receive, from the point-of-recognition optimizer servers 104 and/or 140, the user ID of user 106 and an indication of a competing purchasable-unit that is manufactured, distributed, or otherwise provided by the competing purchasable-unit distributor. Each of the competing purchasable-unit distributor servers A-C(152-156) may access user 106's user-centric information profile, using the user 106's user ID, to receive user 106's user information, user score, or other information that is stored for user 106 at the local point-of-recognition optimizer servers 104 or the remote point-of-recognition optimizer servers 140. In other embodiments the competing purchasable-unit distributor servers A-C(152-156) may each receive the user 106's user-centric information profile, which includes the user ID of user 106 and other information, such that the competing purchasable-unit distributor servers A-C (152-156) would not need to access the local point-of-recognition optimizer servers 104 or the remote point-of-recognition optimizer servers 140 to retrieve the user 106's user-centric information profile or related information.

Based on user 106's user-centric information profile and other related information, each of the competing purchasable-unit distributors A-C 150 may bid on the opportunity to send an offer to the user 106's optimizer device 110. The offer may be for the distributor's indicated competing purchasable-unit that is available from the distributor, and may include a discount, coupon, advertisement, incentive, or other message related to the respective distributor's competing purchasable-unit. For example, a given bid may be an electronic transmission to the store 102 owner or operators, such as to the local point of-recognition optimizer servers 104 or the remote point-of-recognition optimizer servers 140, and may include a fee-based bid that includes an indication of a fee that a respective competing purchasable-unit distributor A-C 150 (e.g., competing purchasable-unit distributor A) is willing to pay to the store 102 owner or operator for the opportunity of user 106's optimizer device 110 to receive an offer (e.g., from the competing purchasable-unit distributor A).

As described in various embodiments herein, the competing purchasable-unit distributors A-C 150 (e.g., competing purchasable-unit distributor A) that outbids the other competing purchasable-unit distributors A-C 150 (e.g., competing purchasable-unit distributors B and C) is the outbidding distributor and may send the offer to the point-of-recognition servers 104 and/or 140, where the offer may be routed and transmitted by the point-of-recognition servers 104 and/or 140 to the optimizer device 110 for display to user 106. The user 106 may then chose to accept the offer, for example, by inputting an acceptance selection via the optimizer device 110 or by placing the offered purchasable-unit in the user container 108 as further described herein. The user 106 may also chose to reject the offer by choosing a different purchasable-unit or by not purchasing any purchasable-unit.

Figure 2:
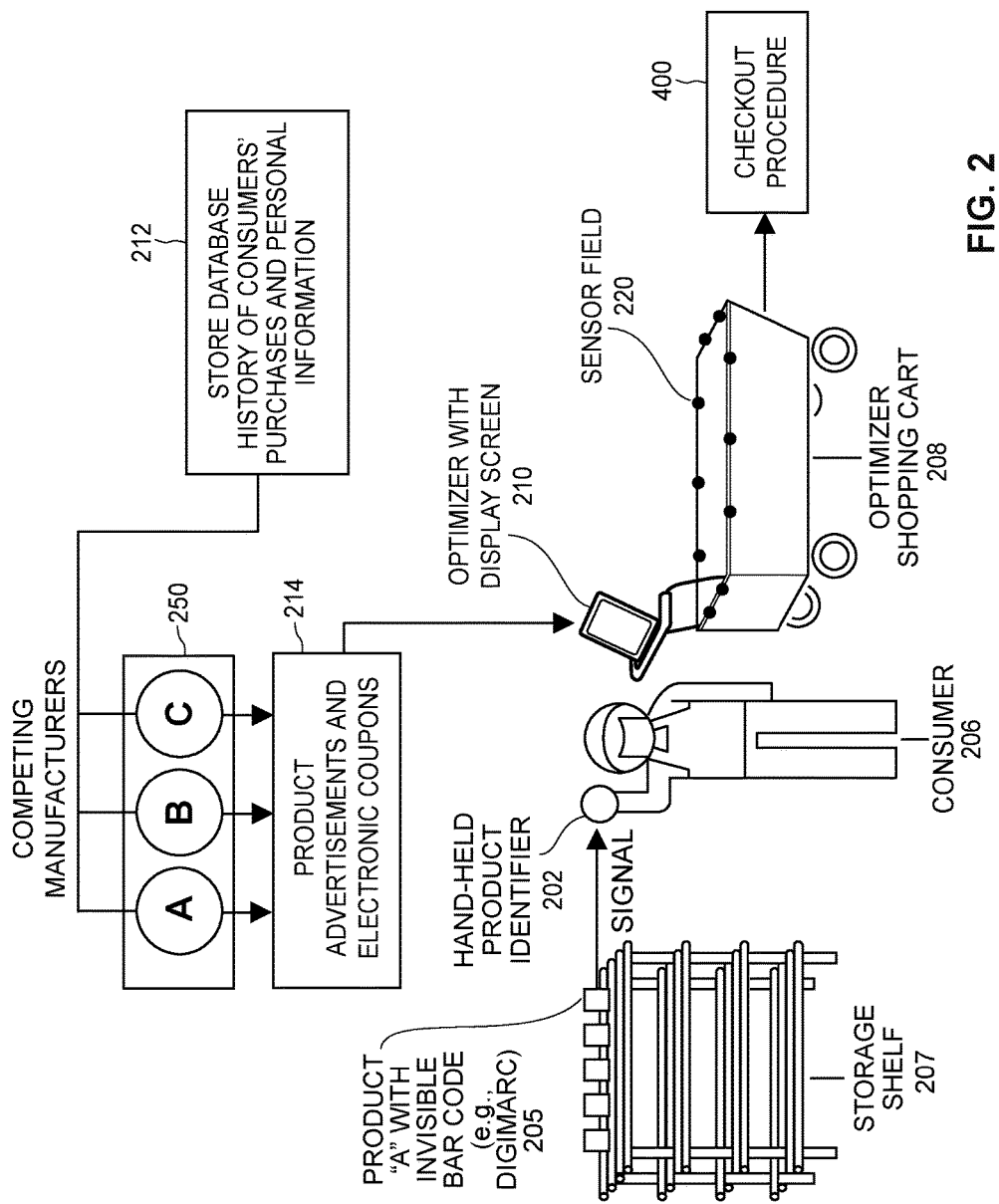
FIG. 2 illustrates an embodiment of a consumer-oriented purchase transaction using the point-of-recognition optimizer systems and methods described herein.

FIG. 2 illustrates an embodiment of a consumer-oriented purchase transaction using the point-of-recognition optimizer systems and methods described herein. In the embodiment of FIG. 2, consumer 206 corresponds to user 106 and optimizer shopping cart 208 corresponds to user container 108 of FIG. 1, respectively, where each of consumer 206 and optimizer shopping cart 208 are specific embodiments of user 106 and user container 108, respectively. Accordingly, the disclosure of FIG. 1 for user 106 and user container 108 apply similarly herewith with respect to FIG. 2.

In the embodiment of FIG. 2 consumer 206 may enter a physical store, such as store 102, and receive the optimizer shopping cart 208. In the embodiment of FIG. 2, the optimizer shopping cart 208 includes an optimizer device 210. Optimizer device 210 corresponds to the optimizer device 110 of FIG. 1, and, accordingly, the disclosure of FIG. 1 for the optimizer device 110 applies similarly herewith with respect to FIG. 2. In the embodiment of FIG. 2, the optimizer device 210 is an electronic device including one or more processors, software, including, for example, mobile App software (e.g., mobile App software based on Apple iOS, Google Android, or other mobile App platform software), and a display screen that may be viewed by consumer 206. The optimizer shopping cart 208 also includes one or more sensors that, with respect to embodiment of the optimizer shopping cart 208, create a sensor field 220 that is operable to detect when consumer 206 places a purchasable-unit into the shopping cart 208 and is operable to detect when consumer 206 removes a purchasable-unit from the shopping cart 208. As described for container unit 108, the sensors of the sensor field 220 can include infrared (IR) sensors, motion detection sensors, image detection sensors, weight detection sensors, accelerometers, gyro sensors, or other such sensors. In several embodiments, the sensors of the sensor field 220 communicate, via wired or wireless transmission, with the optimizer device 210, where the user's placement of a purchasable-unit in the optimizer shopping cart 208 can cause the optimizer to display a price or other information on the display screen of the optimizer device 210.

In certain embodiments, the point-of-recognition optimizer servers 104 and/or 140 may also be configured to communicate with a user container (e.g., shopping cart 208), either directly or indirectly via an optimizer device (e.g., optimizer device 210). For example, in such embodiments, the point-of-recognition optimizer servers 104 and/or 140 may store instructions, e.g., in computer memory of the point-of-recognition optimizer servers 104 and/or 140, for identification of purchasable-units via related purchasable-unit IDs. One or more processors, as described herein, of the point-of-recognition optimizer servers 104 and/or 140 may be configured to execute the instructions. The point-of-recognition optimizer servers 104 and/or 140, e.g., via their respective one or more processors, may be communicatively coupled to a wireless transceiver (e.g., wireless transceiver 126). For example, the wireless transceiver may send and receive wireless transmissions using any one or more of the Bluetooth, WiFi, or cellular wireless transmission standards. The wireless transceiver (e.g., wireless transceiver 126) may be communicatively coupled either directly to the point-of-recognition optimizer servers 104 and/or 140 or indirectly, e.g., via a network (e.g., network 130, private store network 123, etc.).

A user container (e.g., shopping cart 208) may have one or more sensors (e.g., the sensors of the sensor field 220) and a wireless transceiver (not shown). The wireless transceiver of the user container (e.g., shopping cart 208) may be configured to send and receive wireless computer transmissions to and from at least one of (1) a wireless transceiver of an optimizer device (e.g., optimizer device 210) as associated with a user, or (2) the wireless transceiver (e.g., wireless transceiver 126) of point-of-recognition optimizer servers 104 and/or 140. As described herein, the user container is onsite at the physical location and may be configured to detect, via the one or more sensors (e.g., the sensors of the sensor field 220), a chosen purchasable-unit when the user places the chosen purchasable-unit in the user container (e.g., shopping cart 208). In certain embodiments, the chosen purchasable-unit may have a plurality of surfaces (e.g., the plurality of surfaces of product packaging, a box, etc.). In such embodiments, the chosen purchasable-unit ID may be identifiable, via one or more sensors (e.g., the sensors of the sensor field 220), on one or more of the plurality of surfaces. For example, in such embodiments, the one or more sensors may identify the placement of the chosen purchasable-unit in the shopping cart 208 when the chosen purchasable-unit contains an invisible Digimarc barcode (e.g., as described herein) imprinted one or more surfaces of the purchasable-unit product packaging. In such embodiments, the purchasable-unit ID may be based on the Digimarc standard or otherwise use the Digimarc based standard, for example, where the purchasable-unit ID is encoded on the one or more surfaces of purchasable-unit product packaging using the Digimarc based standard.

In related embodiments, the chosen purchasable-unit may be associated with a radio frequency identification (RFID) tag. In such embodiments, the chosen purchasable-unit ID is identifiable, via one or more sensors (e.g., the sensors of the sensor field 220), from the RFID tag, where the RFID tag has encoded the chosen purchasable-unit ID. Thus, in such embodiments, the one or more sensors (e.g., the sensors of the sensor field 220) may be arrayed to recognize the RFID tag when a user places the chosen purchasable-unit in the shopping cart 208.

In further related embodiments, a user container may include one or more sensor indicators (not shown). The one or more sensor indicators may be configured to indicate a status of the one or more sensors (e.g., a status of the sensors of the sensor field 220). In various aspects, the one or more sensor indicators may be configured to visually or audibly indicate the status of the one or more sensors (e.g., the sensors of the sensor field 220). For example, the one or more sensor indicators may visually emit different color indications, or different audible tones, indicating that the one or more sensors of the user container successfully detected (or failed to detect) a chosen purchasable-unit ID of a chosen a purchasable-unit. Thus, the status of the one or more sensors, e.g., via the visual or audible indicators, may indicate at least one of a success status or a failure status, where the one or more sensor indicators are configured to indicate the success status or failure status when the user places the chosen purchasable-unit in the user container. As an example embodiment of a visual indicator, the normal color of the sensor indicator(s) (e.g., indicators of the sensors of the sensor field 220) may be yellow. In such example, when a chosen purchasable-unit passes through the sensor field 220 and is accurately identified (e.g., the related purchasable-unit ID is detected), the sensor indicator(s) may flash or change to green. In contrast, when a chosen purchasable-unit passes through the sensor field and is not accurately identified, the sensor indicators(s) may flash or change to red. In such case, a user may readjust the position of the chosen purchasable-unit in the user container (e.g., shopping cart 208) to attempt a successful identification by the sensors (e.g., the sensors of the sensor field 220), which may be indicated by the sensor indicator(s) turning green. In embodiments where the product is deposited in the cart without proper identification by the sensors (e.g., the sensors of the sensor field 220), the point-of-recognition optimizer servers 104 and/or 140 may receive a wireless transmission indicating the error. In such situations, the consumer may subsequently need to utilize a manual checkout procedure (e.g., checkout lane or station in the store 102).

It is to be understood that other indicators, in addition to visual and audible indicators as described above, may be used instead of, or in addition to, those described herein.

The one or more processors of the point-of-recognition optimizer servers 104 and/or 140 may be configured to receive, via the communicatively coupled wireless transceiver (e.g., wireless transceiver 126), a purchasable-unit ID associated with the chosen purchasable-unit from at least one of (1) the wireless transceiver of the optimizer device (e.g., optimizer device 210), or (2) the wireless transceiver of the user container. Thus, the point-of-recognition optimizer servers 104 and/or 140 are able to receive, either directly from the user container (e.g., shopping cart 208), or indirectly from the optimizer device (e.g., optimizer device 210), a purchasable-unit ID associated with a chosen purchasable-unit that the user placed in the user container (e.g., shopping cart 208).

In some embodiments, the one or more processors of the point-of-recognition optimizer servers 104 and/or 140 may be configured to determine a plurality of competing purchasable-units based on the purchasable-unit ID. The determination may include the optimizer server sending the purchasable-unit ID to one or more distributor servers associated with a plurality of competing purchasable-unit distributors. The determination may further include the optimizer server receiving one or more offers from the one or more distributor servers corresponding to the plurality of competing purchasable-units, where the plurality of competing purchasable-units are located either onsite at the physical location or offsite of the physical location. The one or more processors of the point-of-recognition optimizer servers 104 and/or 140 may transmit, via a second computer transmission to the optimizer device (e.g., optimizer device 210), an offer for an offered purchasable-unit. As described herein, the offer may originate from the one or more distributor servers of an outbidding purchasable-unit distributor, where the offer was chosen from the one or more offers such that the one or more distributor servers of the outbidding purchasable-unit distributor outbid the one or more distributor servers of all other distributors from the plurality of competing purchasable-unit distributors for an opportunity of the optimizer device to receive the offer.

In some embodiments, the point-of-recognition optimizer servers 104 and/or 140 may be configured to determine that an interference threshold value has been passed regarding the user's interaction with the user container (e.g., shopping cart 208). In such embodiments, the point-of-recognition optimizer servers 104 and/or 140 may be further configured to generate, based on the interference threshold value, an alert, the alert indicating to onsite personnel at the physical location to assist the user.

In still further embodiments, the point-of-recognition optimizer servers 104 and/or 140 may be configured to initiate a purchase request, based on the purchasable-unit ID, to purchase the chosen purchasable-unit on behalf of the user when the user is within a proximity to an exit of the physical location. In such embodiments, the point-of-recognition optimizer servers 104 and/or 140 may update a user-centric information profile associated with the user based on the purchase request.

In the embodiment of FIG. 2, consumer 206 may use hand-held product identifier 202 to identify a purchasable unit identifier (ID) associated with purchasable-unit, such as product A 205. The hand-held product identifier 202 may be a part of the optimizer device 210 that communicates with the remainder of the optimizer device 210 to facilitate optimizing onsite user purchases as described herein. For example, in the embodiment of FIG. 2, the hand-held product identifier 202 is a separate electronic device that may communicate with optimizer device 210 using wireless communication protocols or standards such as the Bluetooth standard or the IEEE 802.11 specification protocol. In another embodiment, the hand-held product identifier 202 is included as part of the optimizer device 210 as a single electronic device, which can be, for example, any of the tablet device 112, the mobile phone 114, or any other such portable electronic device 116 as shown and described for FIG. 1. For example, in an embodiment where the optimizer device 210 is the consumer 206 mobile phone, the consumer's mobile phone will include both the functionality of the optimizer device 210 and hand-held product identifier 202 as described herein.

Product A 205 may be one of several competing purchasable-units available onsite at store 102, where product A 205 may be stocked in a similar physical onsite location, such as storage shelf 207 within store 102, with other competing purchasable-unit products distributed by other competing purchasable-unit distributors, including competing manufactures or wholesalers, for example, competing purchasable-unit distributors A-C 250. In the embodiment of FIG. 2, competing purchasable-unit distributors A-C 250 are depicted as competing manufacturers, but that correspond to the competing purchasable-unit distributors A-C 150 of FIG. 1. Accordingly, the disclosure of FIG. 1 for the competing purchasable-unit distributors A-C applies similarly herewith with respect to FIG. 2.

Each of the competing purchasable-units, including product A 205, such as those on storage shelf 207, may include a unique purchasable-unit ID that identifies the respective purchasable-unit, including information about the product and/or specific purchasable-unit (e.g., a product ID of the product or serial number of the purchasable-unit). In some embodiments, a purchasable-unit ID may be invisible (e.g., not discernible without detailed inspection) and/or embedded over the entire product package. For example, in certain embodiments, a purchasable-unit may have a plurality of surfaces where the purchasable-unit ID is identifiable to the optimizer device 210/hand-held product identifier 202 on each of the plurality surfaces. Consequently, the optimizer device 210/hand-held product identifier 202 can identify a purchasable-unit ID simply being pointed at, or by being within a vicinity of, the related purchasable-unit. Such embodiments avoid the conventional procedure of having to specifically locate a UPC barcode on a given product.

For example, one example technology, provided from Digimarc Corporation, is a Digimarc barcode that is invisible and embedded over the entire packaging of a product. Use of the Digimarc barcode, for example, at least in some embodiments, would allow a purchasable-unit ID to be provided on a plurality of surfaces of a purchasable-unit, and would avoid the need for identification of a UPC barcode.

In the embodiment of FIG. 2, once the purchasable-unit identifier (ID) associated with the purchasable-unit product A 205 has been identified by the optimizer device 210/hand-held product identifier 202, the purchasable-unit identifier (ID) may be received by the point-of-recognition optimizer system (not shown) including, for example, any of the local point-of-recognition optimizer servers 104 or the remote point-of-recognition optimizer servers 140 of FIG. 1.

The point-of-recognition optimizer servers 104 and/or 140 may then determine a plurality of competing purchase-units based on the recognized purchasable unit's purchasable-unit ID. The plurality of competing purchase-units may include the recognized purchasable-unit (e.g., purchasable-unit product A 205) as identified by the optimizer device 210/hand-held product identifier 202, and also one or more additional purchasable-units. (For example, in one embodiment, the one or more additional purchasable-units may include the remaining, competing purchasable-units located on storage shelf 207. In another embodiment, the one or more additional purchasable-units may include offsite, competing purchase-units that are available from offsite distributors, including manufacturers and/or wholesalers, who do not yet have their purchasable-units in inventory or display at the store 102. For example, in the present embodiment, purchasable-unit distributor C, as shown in FIGS. 1 and 2 may be an offsite distributor. In such an embodiment, the offsite distributors (e.g., such as distributor C) may be especially incentivized to bid for an opportunity to communicate with a consumer because, for example, offsite distributor C would not have an onsite product or purchasable-unit for the consumer to interact with. The offsite distributor C may, however, benefit by not having to purchase floor or shelf space at store 102 to place purchase-units. Where offsite distributor C is a smaller company or distributor, the offsite functionally of the optimizer system allows such smaller distributors to offer competitive prices vis-à-vis larger distributors (e.g., distributor A) who may have purchasable-units onsite. Accordingly, a benefit to offsite distributors may be securing a sizable number of consumer sales without having any product at the store 102. In some instances, the sizable number of consumer sales may lead the owner of store 102 to decide to display the offsite distributor's product in the store 102. For example, the store 102 owner may already have benefited through fees earned due to higher bids from the offsite distributor. In addition, consumers may benefit from offers from the offsite distributor via lower prices and greater variety resulting from increased competition from offsite distributors orchestrated by the features and functionality of optimizer systems and methods as described herein.

In either embodiment, each of the plurality of competing purchase-units may correspond to purchasable-units manufactured by, distributed by, or otherwise provided by each of the competing purchasable-unit distributors A-C 250, which, as described can be either an onsite distributor, an offsite distributor, or a distributor that offers products in both an onsite and offsite capacity.

The point-of-recognition optimizer servers 104 or 140 may then send to each of the competing purchasable-unit distributors A-C 250 the user ID of consumer 206 and an indication of the distributor's specific competing purchasable-unit that was determined to be a competing purchasable-unit by the point-of-recognition optimizer servers 104 and/or 140. For example, manufacturer A of competing purchasable-unit distributors A-C 250 would receive an indication that the purchasable-unit product A 205 was a competing purchasable-unit that was determined to be a competing purchasable-unit by virtue of the consumer 206 identifying purchasable-unit product A 205 with the optimizer device 210/hand-held product identifier 202. As another example, manufacturer B of competing purchasable-unit distributors A-C 250 would receive an indication that purchasable-unit product B (not shown, but included on storage shelf 207) was a competing purchasable-unit that was determined to be a competing purchasable-unit by virtue of being a similar or competing product to purchasable-unit product A 205. Manufacturer C would receive similar information.

Using the user's ID, each of the competing purchasable-unit distributors A-C 250 may access a store database 212 that maintains a history of consumer 206's purchases and related personal information. The store database 212 can include consumer 206's user-centric information profile and other user information and may be stored in any of any of the local point-of-recognition optimizer servers 104 or the remote point-of-recognition optimizer servers 140, as described herein for FIG. 1.

Based on the user-centric information profile and/or user information from store database 212, each of the competing purchasable-unit distributors A-C 250 may bid on the opportunity of the optimizer device 210 to receive an offer from the outbidding distributor. In the embodiment of FIG. 2, manufacture A may outbid manufacturers B and C by agreeing to pay an advertising fee to the owner or operators of the physical store, such as store 102, where consumer 206 is onsite at. In such an embodiment, outbidding manufacturer A may send an offer 214, which can include product advertisements, electronic coupons, or other incentives, to the point-of-recognition optimizer servers 104 and/or 140, where the point-of-recognition optimizer servers 104 and/or 140 may transmit the offer 214 to optimizer device 210 for display to consumer 206.

In the embodiment of FIG. 2, the offer 214 may incentivize consumer 206 to purchase the purchasable-unit of product A 205. The user can place the purchasable-unit product A 205 in the optimizer shopping cart 208 indicating a desire to purchase purchasable-unit product A 205. As more fully described with respect FIGS. 3 and 4, the sensor field 220 can detect that the purchasable-unit product A 205 has been placed in the optimizer shopping cart 208 and that consumer 206 has not crossed an interference threshold value by overly tampering with the placement or arrangement of the purchasable-unit product A 205 within the optimizer shopping cart 208.

Figure 3:
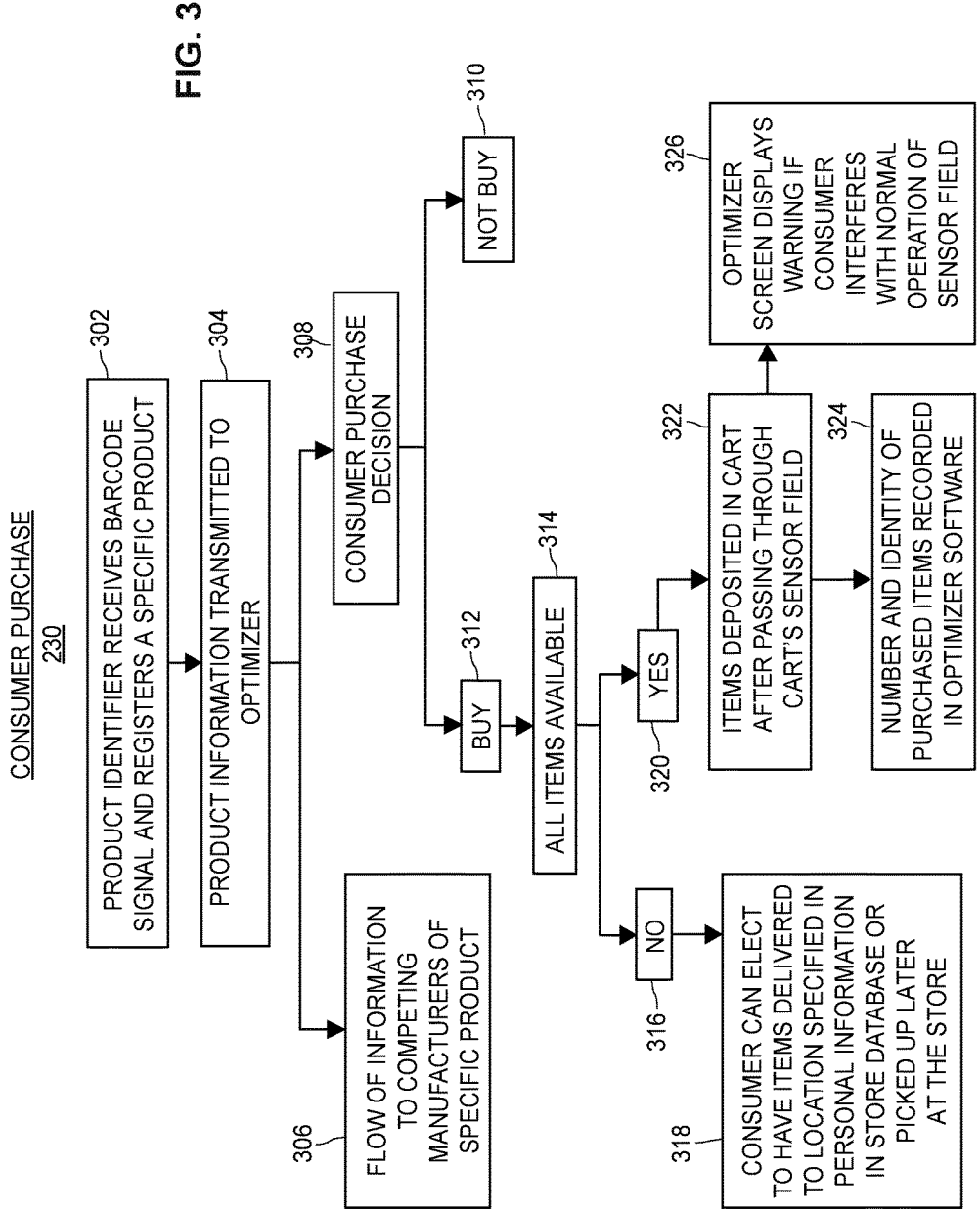
FIG. 3 illustrates an embodiment of a consumer purchase procedure in accordance with the point-of-recognition optimizer systems and methods described herein.

In the embodiment of FIG. 2, when the user is within a proximity to an exit of the physical location, such as the exit of store 102, the point-of-recognition system can begin a consumer purchase procedure 230, which is more fully described in FIG. 3, where the consumer purchase procedure 230 includes sending a purchase request, based on the chosen purchasable-unit ID, so that the consumer 206 may purchase the related chosen purchasable-unit.

In some embodiments, the purchase request may cause the consumer 206's purchase history and/or other user information to be updated with the new purchase transaction, where the new information is stored, for example, in store database 212 on the point-of-recognition optimizer servers 104 and/or 140.

FIG. 3 illustrates an embodiment of a consumer purchase procedure 230 in accordance with the point-of-recognition optimizer systems and methods described herein. At block 302, a product identifier, such as an optimizer device 110 or 202/210, may receive a barcode signal (e.g., a signal indicative of the purchasable-unit ID) and may register or identify a specific product, for example, the recognized purchasable-unit identified with the barcode signal. The barcode signal can be received by the optimizer device 110 or 202/210 where the optimizer device 110 or optimizer device 202/210 identifies the purchasable-unit ID via infrared (IR), radio frequency, or image scanning technology.

At block 304, product information may be transmitted to the point-of-recognition optimizer system. For example, as described herein, the product information may include information about the recognized purchasable-unit, including the purchasable-unit ID of the recognized purchasable-unit. Such information can be transmitted to the point-of-recognition optimizer servers 104 and/or 140, where a determination of a plurality of competing purchasable-units can be made based on the purchasable-unit ID.

At block 306, the flow of user and specific product information may be sent to the competing purchasable-unit distributors (e.g., manufacturers) regarding specific products. For example, this can be the competing purchasable-unit distributors A-C of FIGS. 1 and 2. As described herein, each of the competing purchasable-unit distributors A-C can receive the user and specific product information, including the user's user ID, user-centric information profile, and competing product information available of the respective distributor, where such information can be used by each of the distributors A-C to generate respective bids for the opportunity of the user's optimizer device to receive an offer associated with an offered purchasable-unit from the winning, outbidding distributor. The outbidding distributor may transmit the offer to the point-of-recognition optimizer servers 104 and/or 140 for transmission to the consumer's optimizer device for display.

At block 308, the consumer, such as consumer 206 of FIG. 2, makes his or her purchase decision by either selecting to purchase the offered purchasable-unit (e.g., product A 205 of FIG. 2) or one of the other competing purchasable-units, such the additional competing units of storage shelf 207 of FIG. 2 or competing offsite purchasable-units. The consumer 206, may also determine not to buy (310) any of the purchasable-units.

At block 312, once the consumer decides to buy one or more of the competing purchasable-units, i.e., the chosen purchasable-units, the point-of-recognition system may determine whether the chosen purchasable-units are available (314) onsite at the physical location, for example, at store 102.

If a chosen purchasable-unit is not available (316), then, at block 318, the consumer can elect to have the chosen purchasable-unit delivered to a location specified in a personal information store database, such as store database 212. For example, the chosen purchasable-unit may not be available onsite (e.g., only available via an offsite distributor) or the chosen purchasable-unit may not be in stock (e.g., where an onsite distributor is out of stock of the chosen purchasable-unit) at the physical location, and the consumer may purchase the chosen purchasable-unit, via the optimizer device, for delivery of the chosen purchasable-unit to the user's home address. The specified address may have been previously stored in the store database 212 so that the consumer need not enter the information again. In another embodiment, the consumer may choose to pick up the chosen purchasable-unit at the store, e.g., after receiving a notification email or text that the chosen purchasable-unit is available for pick up. In some embodiments, the store-pickup alternative option may reduce the price of the chosen purchasable-unit because the distributor's delivery cost may decline as multiple products may be batch delivered to a single location, e.g., store 102. The user may choose the delivery option at time of purchase, where the optimizer device may change the price depending on the delivery option chosen (e.g., a reduced price when the user selects the store-pickup option).

If instead the chosen purchasable-units are available (320), then at block 322, the chosen purchasable-units may be detected by the user's optimizer shopping cart, such as optimizer shopping cart 208, after passing through the cart's sensor field 220. For example, in some embodiments, the chosen purchasable-units may be detected with one or more sensors associated with a user container (e.g., the optimizer shopping cart 208) when the consumer places the chosen purchasable-unit in the user container. As described herein, the user container can be, for example, a shopping cart, shopping basket, or other device or apparatus for detecting purchasable-units chosen by the user.

At block 324, the number and identity of the chosen purchasable-units may be recorded in the optimizer device's software, such that the optimizer device (e.g., 202/210) may then determine the total number and type of chosen purchasable-units and compute and display a total price and other purchase-related information including, for example, sales tax information, discount information received from any related offer, or other such purchase-related information on the display screen of the optimizer device 202/210. For example, in some embodiments, the display screen of the optimizer device (e.g., 202/210) may maintain an updated total of the cost of purchasable-units deposited in the shopping cart, e.g., including money or costs the user saved due to the user accepting offers (e.g., with favorable prices) associated with purchasable-units from the purchasable-unit distributors or manufacturers (e.g., the outbidding purchasable-unit distributor) as described herein. For example, the optimizer device 202/210 may display an updated cost savings value based on an offer from an outbidding purchasable-unit distributor. In still further embodiments, if a purchasable-unit is removed from the cart, the optimizer device may display a recalculated current total reflecting the removal of the purchasable-unit, which may reflect the user no longer accepting the offer. With this graphical display, the consumer is informed during the shopping experience of the cost savings achieved through the use of the optimizer platform and the offers it provides as described herein. In some embodiments, the consumer may purchase the one or more chosen purchasable-units (e.g., purchasable-units remaining in a user container (e.g., shopping cart) by simply exiting the store, as further described in FIG. 4.

At block 326, a display screen of the optimizer device may display a warning if the consumer interferes with normal operation of the user container's sensor field. For example, in some embodiments, the optimizer device may be configured to determine that an interference threshold value has been passed regarding the user's interaction with the user container, and generate, based on the interference threshold value, an alert that indicates to onsite personnel to assist the user. In such an event, store personnel, such as employees of store 102, may be required to manually input purchase data related to the consumer's chosen purchasable-units into the optimizer device.

Figure 4:
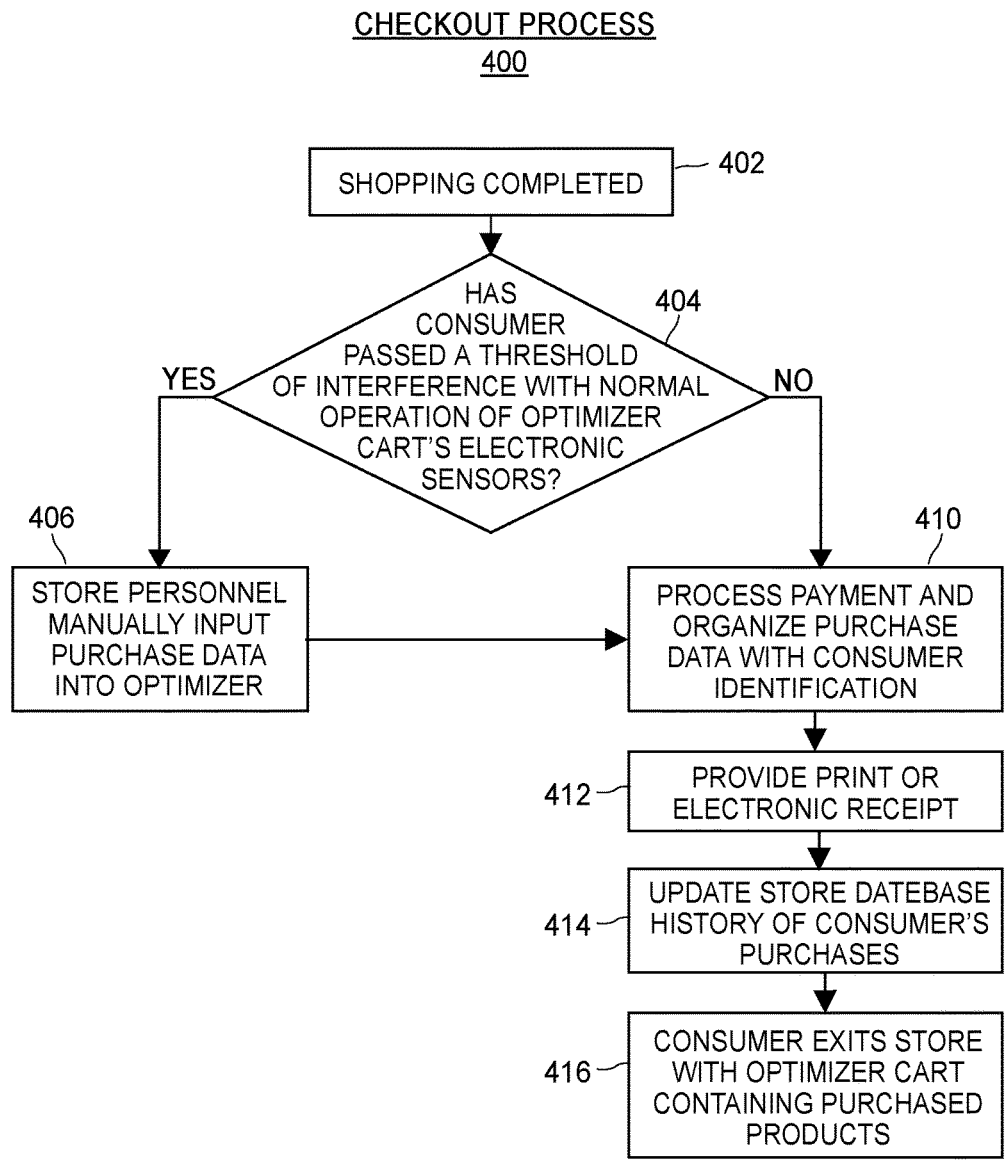
FIG. 4 illustrates an embodiment of a checkout process in accordance with the point-of-recognition optimizer systems and methods described herein.

FIG. 4 illustrates an embodiment of a checkout process 400 in accordance with the point-of-recognition optimizer systems and methods described herein. At block 402, a user, such as user 106 or consumer 206, has completed his or her shopping experience at store 102. This can include, for example, after the user has placed his or her chosen purchasable-units in the user container, such as optimizer shopping cart 208.

At block 404, the user container's sensors, such as the sensor field 220 of the optimizer shopping cart 208, can detect whether the consumer 206 passed a threshold value of interference with respect to normal operation of optimizer shopping cart 208. For example, in one embodiment, the sensor field 220 can detect whether the consumer has moved a purchasable-unit in and out of the optimizer shopping cart 208 more than allowed by an interference threshold value.

If the consumer has passed the threshold value of interference, then, at block 406, store personnel, such as employees of store 102, may be alerted to manually input purchase information into the optimizer device. The threshold value of interference benefits the owner or operator of the store 102 by deterring theft and also by assisting consumers that need help operating the optimizer device, optimizer shopping cart, or otherwise.

At block 410, after the store personnel assist the consumer, or after the consumer has successfully placed a chosen purchasable unit in the optimizer shopping cart 208 without passing the interference threshold value, the point-of-recognition optimizer system, for example, any of the point-of-recognition optimizer servers 104 and/or 140, may receive a purchase request from the optimizer device and may process payment and organize the purchase data using the consumer's identification. In certain embodiments, the optimizer device can initiate a purchase request, based on the chosen purchasable-unit identifier (ID), to purchase the chosen purchasable-unit when the user is within a proximity to an exit of the physical location. For example, after shopping is completed, the consumer may pass a store exit point and avoid the time-consuming conventional checkout process. At that time, the consumer's selected payment option (e.g., pay via a particular credit card), where the option and credit card information may be stored in the consumer's user-centric information profile, may be used to pay for the chosen purchasable-unit in the optimizer shopping cart 208.

At block 412, the point-of-recognition optimizer system, for example, any of the point-of-recognition optimizer servers 104 and/or 140, may cause the execution of print command to print a paper receipt at a printer located onsite at the store, such as store 102, and for which the consumer can retrieve upon exiting the store. In another embodiment, the point-of-recognition optimizer servers 104 and/or 140 can send an electronic receipt to the consumer, such as an email to the consumer's email address indicated in the consumer's user-centric information profile, where the email may include information about the purchase.

At block 414, the point-of-recognition optimizer system, for example, via the optimizer device, may update a store database to update the history of consumer's purchases with the recent purchase. In certain embodiments, based on the purchase request, the optimizer device can cause an update to a user-centric information profile associated with the user. For example, the purchase transaction for the chosen purchasable-unit may be used to update the consumer's purchase history maintained via the store database 212.

At block 416, at least in one embodiment, the consumer may exit the store with the optimizer shopping cart 208 containing the purchased items, which may include the chosen purchasable-units that the consumer placed in the optimizer shopping cart 208 and that were purchased when the consumer passed within the proximity to the exit of the physical store (e.g., store 102) and that triggered the purchase request. In some embodiments, the consumer may leave the optimizer shopping cart 208 at a designated location onsite at the store 102 for a next consumer.

Figure 5:
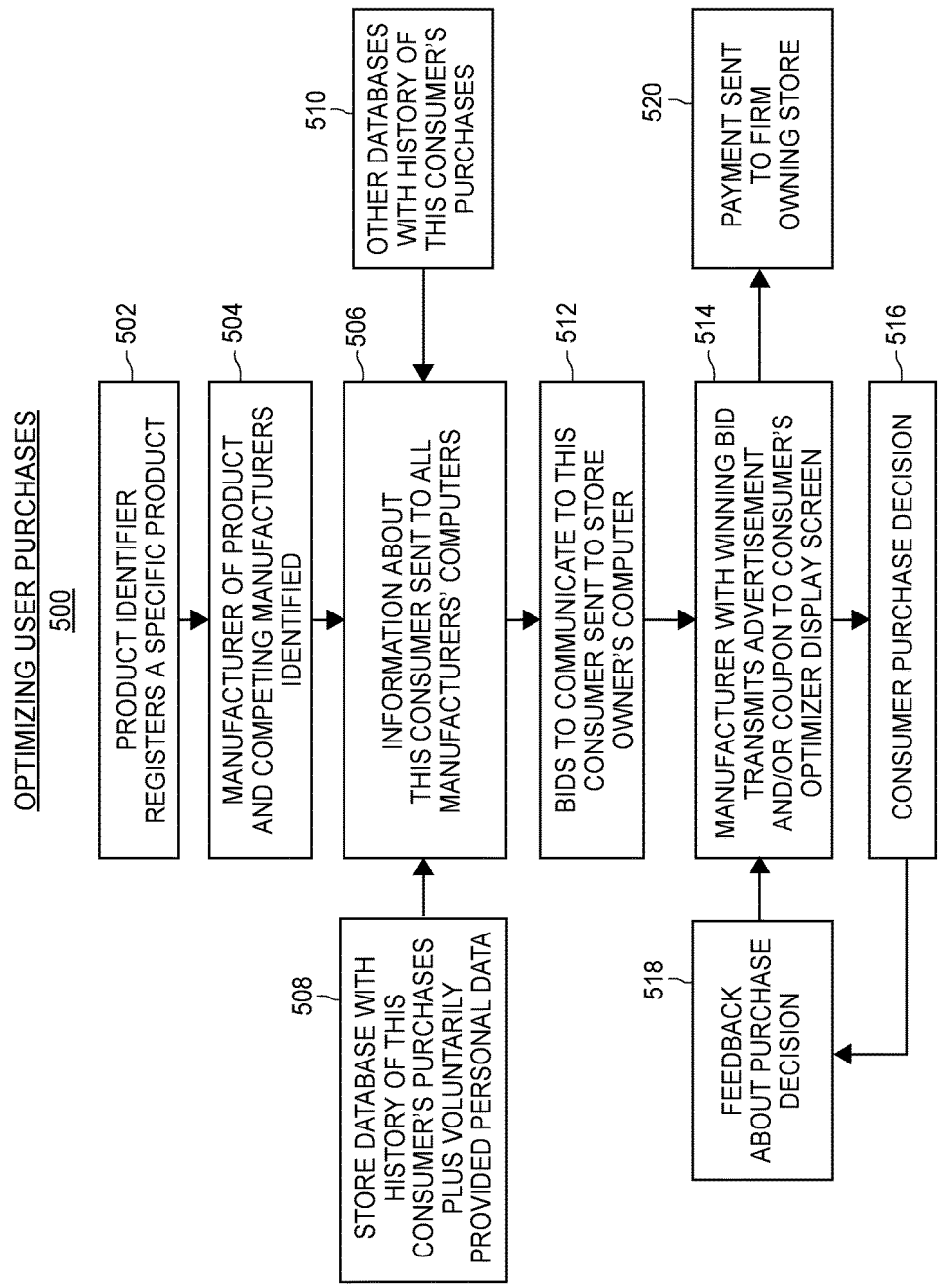
FIG. 5 illustrates an embodiment of method for optimizing user purchases at a physical location in accordance with the disclosures herein.

FIG. 5 illustrates an embodiment of method 500 for optimizing user purchases at a physical location in accordance with the disclosures herein. At block 502, a product identifier, such as the optimizer device 110 or optimizer device 202/210, registers or identifies a specific product, for example, the recognized purchasable-unit identified with the optimizer device 110 or optimizer device 202/210 as described herein. For example, a recognized purchasable-unit and its related purchasable-unit ID may be identified or recognized by an optimizer device associated with a consumer or user. In various embodiments, the recognized purchasable-unit can be located onsite (e.g., at store 102)

with the optimizer device, so that a consumer or user can use the optimizer device to identify the recognized purchasable-unit and its related purchasable-unit ID. For example, as described for FIG. 2, the consumer may use a hand-held product recognizer to point at a purchasable-unit of a product such as Product A 205.

In certain embodiments, the purchasable-unit may have a plurality of surfaces and the purchasable-unit ID may be identifiable to the optimizer device on each of the plurality surfaces as described herein. For example, in the embodiment of FIG. 2, the Digimarc barcode or similar invisible indicator on the surfaces of Product A 205 is recognized and the related purchasable-unit information is transmitted and stored in the optimizer device 210.

In some embodiments, the optimizer device may be a mobile phone or other portable electronic device, such as a tablet, of the user as described for FIG. 1. A store owner or operator may benefit from lower operating costs when the user uses his or her own device as the optimizer because the store owner of operator would not be required to purchase and maintain at least the hardware portion of the optimizer device. In such an embodiment, the user's phone could be updated with mobile App software running an Optimizer App as described herein.

In other embodiments, the optimizer device may be a device provided by the owner or operator of the physical location. For example, the user may be provided an optimizer device as the user enters the store, where the optimizer device may include two separate devices including a hand-held product identifier device for identifying purchasable units and a display screen device for displaying offers as described for FIG. 2.

At block 504, the distributor (e.g., manufacturer) of the products of the recognized purchasable unit and any competing distributors (e.g., manufacturers) are identified. For example, in various embodiments, the point-of-recognition optimizer system, including the point-of-recognition optimizer servers 104 and/or 140, may be configured to receive, via a computer transmission, a purchasable-unit identifier (ID) associated with the purchasable-unit. The purchasable-unit, may be, for example, a unit of a retail product located onsite at a physical store, where the purchasable-unit ID may uniquely identify the unit and/or retail product. The purchasable-unit ID may be used to determine a plurality of competing purchasable-units. The plurality of competing purchasable-units may include the recognized purchasable-unit identified by the optimizer device and one or more additional purchasable-units offered by competing manufacturers, wholesalers, or other distributors. For example, the one or more additional purchasable-units may include one or more offsite, competing purchasable units that are only available via offsite distributors as described herein.

In various embodiments, the plurality of competing purchasable-unit distributors can include one or more product manufacturers and one or more product wholesalers who distributed the corresponding competing purchasable-units to a physical store for onsite identification and selection by consumers. The purchasable-units may be a products manufactured and/or distributed by a particular manufacturer to the physical store and made available to consumers onsite. In other embodiments, the purchasable-units may be products distributed on behalf of a manufacturer by a product wholesaler to the physical store, and, therefore available to consumers onsite. In still further embodiments, the plurality of competing purchasable-unit distributors can include one or more offsite product manufacturers and/or one or more offsite product wholesalers who distribute corresponding competing purchasable-units to consumers directly or via the store, such as store 102, for in-store pick up after a consumer has made a purchase via the optimizer system and methods as disclosed herein.

At block 506, in one embodiment, information about the consumer, such as the consumer's user-centric information profile and related user information stored in store database (e.g., store database 212) as described herein, are sent to all distributors' (e.g., manufacturers') computer servers. As shown for FIG. 2, the competing purchasable-unit distributions or manufacturers of competing products (e.g., distributors B and C) plus distributor A are each prompted, for example, via a computer transmission on network 130, about this specific consumer's interest in product A. Each distributor may also receive information about the consumer's past purchases plus voluntarily-disclosed personal data which may include the user-centric information profile and related user information. Competing purchasable-unit distributors or manufacturers may receive or access a consumer's short term (e.g., consumer's current interest in product A) or long-term purchase history (e.g., past purchases) from a consumer's user-centric information profile and/or related user information, e.g., which may be stored in database (e.g., store database 212) as described herein. For example, competing purchasable-unit distributors or manufacturers may receive or access a consumer's long-term purchase history of the consumer's user-centric profile information when the consumer identifies a specific purchasable-unit (e.g., of product A, and related purchasable-unit ID) with the optimizer device 202/210 and makes purchases over time. In addition, the competing purchasable-unit distributors or manufacturers may also receive or access the consumer's short-term purchase history of the user's user-centric profile information that includes a consumer's short term history (e.g., prior 30 minutes, etc.) of the consumer's activity or interest in recent in-store purchasable-units as reflected by the consumer using, or otherwise identifying with, the optimizer device 202/210 various purchasable-unit(s) in the store (e.g., for product A).

As described above, in certain embodiments, each of the competing purchasable-unit distributors can access the user-centric information profile or other related information from the point-of-recognition optimizer servers 104 and/or 140. The competing purchasable-unit distributors can use the user-centric information profile or other related information to compete in bidding and/or generate offers to users as described herein.

In further embodiments, the point-of-recognition optimizer servers 104 and/or 140 may implement machine learning algorithms that generate machine learning based models (e.g., an optimizer machine learning model) based on the user-centric information profile or other related information. For example, the optimizer machine learning model may be generated (e.g., "trained") using a supervised or unsupervised machine learning program or algorithm. The machine learning program or algorithm may employ a neural network, which may be a convolutional neural network, a deep learning neural network, or a combined learning module or program that learns in two or more features or feature datasets in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in existing data (such as purchasable-units/products that are routinely purchased together by consumers or users using the optimizer device 202/210 or otherwise, or purchasable-units/products that are typically purchased by certain users having or being associated with certain regions, net worth, demographics, etc. as reflected in user-centric information profile and/or other related information across various users) in order to facilitate making predictions for subsequent data (to predict whether a certain user would select an offer from an outbidding purchasable-unit distributor or otherwise engage in a purchase of a purchasable-unit/product from an purchasable-unit distributor or manufacturer, etc.).

Machine learning model(s), such as the optimizer machine learning model, may be created and trained based upon example (e.g., "training data,") inputs or data (which may be termed "features" and "labels") in order to make valid and reliable predictions for new inputs, such as testing level or production level data or inputs. In supervised machine learning, a machine learning program operating on a server, computing device, or otherwise processor(s) (e.g., the point-of-recognition optimizer servers 104 and/or 140), may be provided with example inputs (e.g., "features") and their associated, or observed, outputs (e.g., "labels") in order for the machine learning program or algorithm to determine or discover rules, relationships, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s) (e.g., the point-of-recognition optimizer servers 104 and/or 140), to predict, based on the discovered rules, relationships, or model, an expected output.

In unsupervised machine learning, the server, computing device, or otherwise processor(s) (e.g., the point-of-recognition optimizer servers 104 and/or 140), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

For example, the point-of-recognition optimizer servers 104 and/or 140 may use a consumer's purchase history information from the user-centric information profile or other related information of the consumer as features to train the optimizer machine learning model against labels that may include new, competing, different, similar, or same purchasable-units/products, that may represent new offers or purchase transactions that the user is expected to engage in with respect to related purchasable-units/products. Thus, the optimizer machine learning model may be trained with user-centric profile information or other related information to assist the purchasable-unit distributors or manufacturers in determining, e.g., detailed information related to offers or advertisements, or price reduction offers related to purchasable-units/products, as described herein, which could be transmitted to the consumer's display screen of an optimizer device (e.g., optimizer device optimizer device 202/210). Thus, the optimizer machine learning model may provide a unique, context-specific, and/or time-sensitive aggregation of user-centric profile information or other related information that is unavailable to search engines, such as Google, such that the optimizer machine learning model offers significant value to purchasable-unit distributors or manufacturers, which, in turn, may generate higher revenues to the store 102 owner or optimizer platform operator through increased sales of purchasable-units/products as described herein.

In some embodiments, the output as generated by the optimizer machine learning model may be a user action score that defines a probability of the user to engage in a purchase associated with one or more purchasable-units/products as described herein. The output (e.g., the user action score) may be transmitted to the purchasable-unit distributors or manufacturers from the recognition optimizer servers 104 and/or 140. In addition, or alternatively, the output (e.g., the user action score) may be accessible by the purchasable-unit distributors or manufacturers at the recognition optimizer servers 104 and/or 140. Thus, in various embodiments, an optimizer machine learning model may be generated (e.g., "trained") based on user-centric profile information of one or more users, and the purchasable-unit distributors or manufacturers (e.g., the outbidding purchasable-unit distributor described herein) may receive or access the user action score generated from the machine learning model. The user action score may be used by a purchasable-unit distributor or manufacturer to determine whether to compete in bidding with the other purchasable-unit distributors or manufacturers as described herein, to determine how and/or to what degree to generate an offer to a user/consumer (e.g., such as the amount of the discount to include in the offer) for one or more purchasable-units/products, or to otherwise facilitate the optimization of user purchases of purchasable-units/products as described herein.

In either embodiment, at block 508, the user-centric information profile and related user information may be provided or accessed from the store database, such as store database 212, that includes purchase history for the consumer plus any voluntarily provided personal data. In still further embodiments, at block 510, other databases with a history of the consumer's purchases may be accessed. The other databases may be provided by third parties, including, for example, third parties that utilize their own point-of recognition system, point-of-sale system, online system, or other such systems that maintain user purchase history.

As described herein, the user-centric information profile may include details about the user's past purchase history or other personal information to allow the distributors to generate informed and data-driven offers or advertisements targeted to the user. The user information may have been input via the optimizer device 110, 210 (or, in some embodiments, user laptop 120), where the user information is used to generate or update the user's user-center information profile.

In one embodiment, for example, the optimizer device may include a display unit and an input unit. The display unit, such as a display screen of a mobile device, may be operable to display the offer and the user-centric information to the user. The input unit, such as a keyboard or keypad of a mobile device, may be operable to receive user-centric information for generating or further updating the user-centric information profile. For example, with the optimizer device 110, 210 (or, in some embodiments, user laptop 120) a consumer can enter verifiable and up-to-date information about the consumer's automobile ownership (insurance cards, state registration documents). Accordingly, the make, model, and age of the consumer's cars may become part of consumer's user-centric information profile. Additional information may also be downloaded directly from automobile manufacturers and local firms selling cars to further enhance the consumer's user-centric information profile. By analyzing the user-centric information profile or relate user information, the competing purchasable-unit distributors may therefore assess the attractiveness of the consumer. Such information, combined with the consumer's purchase history data, enables the competing purchasable-unit distributors to better quantify how much to bid for the opportunity to present offers (e.g., advertisements/coupons) to the user's optimizer device and how valuable to make the coupons or other incentives to the consumer. As a consequence, the consumer benefits from competition among competing purchasable-unit distributors.

The input unit may also be operable to receive login information for activating the optimizer device in order to protect the user's user-centric information or preclude other, non-authorized, users from making purchases on the user's behalf. For example, in one embodiment, only after logging in with a name and password, will the screen displayed on the optimizer device show the consumer the status of the consumer's voluntarily-inputted personal data.

In other embodiments, the optimizer device may include an optical unit, such as a camera, sensor, or scanning device, that the user can use to take digital images or source other such optical information from documents including, for example, the user's tax bills, utility bills, or other such records, and use that optical information to generate or update the user-centric information profile. For example, such optical information may be inputted via a camera option on the optimizer device display screen. In one embodiment, the user may take a picture of his or her automobile registrations, tax bills, or other information, etc., where such information may be uploaded to the point-of-recognition optimizer servers 104 and/or 140 and used to generate or update the user-centric information profile.

At block 512, each of the competing purchasable-unit distributors may submit bids to the point-of-recognition optimizer servers 104 and/or 140 and offers for communication to the consumer via the optimizer device. For example, in some embodiments, prior to submitting the bids and offers to the point-of-recognition optimizer servers 104 and/or 140, each of the competing purchasable-unit distributors may receive the consumer's user-centric profile information and/or other user information. Each competing purchasable-unit distributors would then generate bids and offers for transmission back to the point-of-recognition optimizer servers 104 and/or 140. The point-of-recognition optimizer servers 104 and/or 140 may then determine the winning bid and route the offer of the winning bid (e.g., the outbidding distributor's offer) to the user's optimizer device. Accordingly, once the user information is received, the competing purchasable-unit distributors' computers would use algorithms to instantaneously bid for the opportunity to deliver an offer, which can include an advertisement and/or electronic coupon, to the optimizer device's display screen. The offer may be generated based on the user-centric information profile including based on such characteristics including, for example, whether the consumer is high net worth individual, a new consumer, an existing consumer. For example, a high net worth consumer, who may be a new customer of the particular distributor or product, may receive a large discount offer in order to win brand loyalty and thus future purchases from the consumer. As another example, a high net worth consumer, who is an existing customer, may receive a normal discount since the consumer already may make frequent purchases of the related product.

In various embodiments, the particular distributor that gets to display its offer on the optimizer device may have outbid other distributors who competed for the opportunity for the optimizer device, and therefore the user, to receive the offer. For example, the outbidding purchasable-unit distributor is the distributor that wins the bidding process and therefore is able to generate the offer received by the optimizer device, and, therefore the user. The outbidding purchasable-unit distributor may have been chosen from the plurality of competing purchasable-unit distributors, where each of the plurality of competing purchasable-unit distributors, including the outbidding purchasable-unit distributor, may correspond to a respective plurality of competing purchasable-units. The plurality of competing purchasable-units may include the recognized purchasable-unit, the offered purchasable unit, and any remaining purchase-units have similar or competing features.

In one embodiment, the plurality of competing purchasable-units can include a same type of purchasable-unit, where the purchasable-units are commodities or near-commodities to one another. In other embodiment, for example, the plurality of competing purchasable-units can include two or more purchasable-units of different product types, where the products are not commodities, but instead provide competing features or that can be used in a manner such that a consumer could choose one product over the other.

In some embodiments, the offered purchasable-unit may be the same as the recognized purchasable-unit. For example, in such embodiments, the offer may originate from the distributor of the recognized purchasable-unit, where the distributor of the recognized purchasable-unit outbid all other distributors for the opportunity of the optimizer device to receive the offer as described herein.

In other embodiments, the offered purchasable-unit is different from the recognized purchasable-unit. For example, in such embodiments, the offer may originate from a new distributor, different from the distributor of the recognized purchasable-unit, where the new distributor outbid all other distributors, including the distributor of the recognized purchasable-unit, for the opportunity of the optimizer device to receive the offer as described herein.

In one embodiment, the outbidding purchase-unit distributor may be the distributor that agrees to pay a highest distributor fee, with respect to each of the other distributors, to the owner or operator of the store, such as store 102, for the opportunity of the user's optimizer device to receive the offer as described herein. Accordingly, the highest bidder may be rewarded the opportunity and may pay a fee to the store owner or operator, which may be ultimately tied to whether the consumer subsequently buys their product.

In other embodiments, the outbidding purchase-unit distributor may also be the distributor that submits or bids a best value to the user or consumer, such that the offer includes an offer value that is most favorable to the consumer. In such embodiments, the offer value may be based on the user's user-centric information. For example, the value of coupons offered to consumers may be tied to their purchase histories and personal data, including verifiable data, accessible by the optimizer device as described herein.

At block 514, the point-of-recognition optimizer servers 104 and/or 140 sends a second computer transmission regarding the competing purchasable-unit distributor (e.g., manufacturer) having the winning bid and transmits the related offer (e.g., the advertisement and/or coupon) to consumer's optimizer display screen. Thus, the point-ofrecognition optimizer system can transmit, via a second computer transmission, the offer for an offered purchasable-unit to the optimizer device, where the user can view the offer on the optimizer device. As described herein, the offer may originate from the outbidding purchasable-unit distributor.

At block 516, the consumer may make a purchase decision, which may include placing a chosen purchasable-unit into a user container, such as optimizer shopping cart 208 as described herein. In various embodiments, the optimizer device may be used to facilitate a user purchase. For example, in some embodiments the optimizer device may be configured to detect that a chosen purchasable-unit has been associated with the user. The chosen purchasable-unit can be a purchasable-unit that the user choses to purchase, which can be any of the recognized purchasable-unit, the offered purchasable-unit, any of the other plurality of competing purchasable-units onsite at the physical location, or any other plurality of competing offsite purchase-units that are only available via offsite distributors as described herein. In any event, the chosen purchasable unit can be identified with a chosen purchasable-unit identifier (ID) that uniquely identifies the chosen purchasable-unit identifier (ID). For example, the chosen purchasable-units that are deposited by a consumer in his or her optimizer shopping cart 208 may be detected by the sensor field 220 via the purchasable-unit identifier (ID) such that the optimizer device may record the price and number purchasable-units for purchase.

In certain embodiments, a the optimizer system and methods may involve only offsite purchasable-units, for example, where the user may interact with the optimizer device to purchase offsite purchasable units displayed on the optimizer device and receive competing offers from competing purchasable-unit distributors as described herein. In one example embodiment, the user may identify a recognized offsite purchasable-unit displayed on, and available for purchase via, the optimizer device. In such embodiments, the consumer may either be onsite or offsite the physical store location. The point-of-recognition optimizer servers 104 and/or 140 may receive, via a computer transmission from the optimizer device, a purchasable-unit identifier (ID) associated with the recognized, offsite purchasable-unit. The point-of-recognition optimizer servers 104 and/or 140 may then determine a plurality of competing purchasable-units based on the purchasable-unit ID, where the plurality of competing purchasable-units includes the recognized purchasable-unit and one or more additional purchasable-units. The additional purchasable-units may be purchasable-units offered from offsite distributors, where the additional purchasable-units are offsite from the user's current location. The point-of-recognition optimizer servers 104 and/or 140 may then transmit, via a second computer transmission to the optimizer device, an offer for an offered purchasable-unit, where the offer originates from an outbidding purchasable-unit distributor. As described herein, the outbidding purchasable-unit distributor may be chosen from a plurality of competing purchasable-unit distributors and the plurality of competing purchasable-unit distributors may correspond to the plurality of competing purchasable-units, where the outbidding purchasable-unit distributor outbid all other distributors from the plurality of competing purchasable-unit distributors for an opportunity of the optimizer device to receive the offer. Accordingly, in such embodiments, the optimizer systems and methods, where competing, offsite purchasable-unit distributors compete for and bid for a consumer's business, can be made available to wholly online sources, for example, online web stores and websites.

At block 518, the point-of-recognition system, such as the point-of-recognition servers 104 and/or 140, may receive feedback about purchase decision. The feedback can include the number and prices about the purchasable-units that the consumer purchases. The feedback can be used to update the user's user-centric information profile as described herein.

At a point in time of the user shopping experience, e.g., after checkout is completed, the optimizer device may prompt the consumer that additional advertisements/coupons are available for viewing that may be unrelated to specific products on store shelves, but potentially of interest and valuable to the consumer.

At block 520, where the consumer purchased at least one purchasable-unit, payment for the purchasable-unit(s) may be sent to the firm owning or operating store, such as store 102.

ADDITIONAL CONSIDERATIONS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A point-of-recognition optimizer system configured to optimize user purchases at a physical location, the point-of-recognition optimizer system comprising:
   a computer memory operating to store instructions to optimize user purchases at the physical location; and
   a processor operating to execute the instructions,
   the processor and the computer memory comprising an optimizer server, the processor executing the instructions on the optimizer server to:
   (a) receive at the optimizer server, via a computer transmission from an optimizer device associated with a user, a purchasable-unit identifier (ID) associated with a recognized purchasable-unit, the purchasable-unit ID identified by the optimizer device, wherein the recognized purchasable-unit is located onsite at the physical location with the optimizer device,
   (b) determine a plurality of competing purchasable-units based on the purchasable-unit ID, the determination including the optimizer server sending the purchasable-unit ID to one or more distributor servers associated with a plurality of competing purchasable-unit distributors, and the optimizer server receiving one or more offers from the one or more distributor servers corresponding to the plurality of competing purchasable-units, the plurality of competing purchasable-units located either onsite at the physical location or offsite of the physical location, and
   (c) transmit from the optimizer server, via a second computer transmission to the optimizer device, an offer for an offered purchasable-unit, the offer originating from the one or more distributor servers of an outbidding purchasable-unit distributor, the offer chosen from the one or more offers, wherein the one or more distributor servers of the outbidding purchasable-unit distributor outbid the one or more distributor servers of all other distributors from the plurality of competing purchasable-unit distributors for an opportunity of the optimizer device to receive the offer.

2. The point-of-recognition optimizer system of claim 1, wherein the user is associated with a user-centric information profile having user-centric information, the user-centric information including at least one of short-term term purchase history of the user or long-term purchase history of the user.

3. The point-of-recognition optimizer system of claim 2, wherein the one or more processors and one or more computer memories are configured to enable the outbidding purchasable-unit distributor to receive or access the user-centric information associated with the user to generate the offer.

4. The point-of-recognition optimizer system of claim 1, wherein a machine learning model is trained based on user-centric information of one or more users, and wherein the outbidding purchasable-unit distributor receives or accesses a user action score of the user generated from the machine learning model based on the user's user-centric information of the user's user-centric information profile.

5. The point-of-recognition optimizer system of claim 4, wherein the user action score defines a probability of the user to engage in a purchase of at least one of the plurality of competing purchasable-units.

6. The point-of-recognition optimizer system of claim 1, wherein the optimizer device displays an updated cost savings value based on the offer from the outbidding purchasable-unit distributor.

7. The point-of-recognition optimizer system of claim 4, wherein the offer includes an offer value, and wherein the offer value is based on the user's user-centric information.

8. The point-of-recognition optimizer system of claim 2, wherein the optimizer device includes an optical unit, wherein the user-centric information profile is further updated with additional information sourced from the optical unit.

9. The point-of-recognition optimizer system of claim 2, wherein the optimizer device includes a display unit and an input unit, wherein the display unit is operable to display the offer and the user-centric information to the user, and wherein the input unit is operable to receive login information for activating the optimizer device and receive user-centric information for further updating the user-centric information profile.

10. The point-of-recognition optimizer system of claim 2, wherein the user-centric information is verified against trusted information of the user.

* * * * *